(12) United States Patent
Chiang

(10) Patent No.: US 8,057,136 B2
(45) Date of Patent: Nov. 15, 2011

(54) POWER TOOL COMBINATION

(75) Inventor: Wen Hung Chiang, Taichung Hsien (TW)

(73) Assignee: Hsin Ying Enterprises Co., Ltd., Wantien Tsuen, Dadu Hsiang, Taichung Hsien (TW)

( * ) Notice: Subject to any disclaimer, the term of this patent is extended or adjusted under 35 U.S.C. 154(b) by 753 days.

(21) Appl. No.: 12/217,880

(22) Filed: Jul. 9, 2008

(65) Prior Publication Data

US 2010/0008739 A1    Jan. 14, 2010

(51) Int. Cl.
*B23B 51/08* (2006.01)

(52) U.S. Cl. .................. 408/238; 7/158; 7/165; 279/14; 279/82

(58) Field of Classification Search .............. 7/158, 165; 408/238–240; 279/14, 82
See application file for complete search history.

(56) References Cited

U.S. PATENT DOCUMENTS

| | | | | |
|---|---|---|---|---|
| 3,484,114 A | * | 12/1969 | Rodin | 279/144 |
| 3,932,904 A | * | 1/1976 | Nilsson et al. | 7/158 |
| 4,098,351 A | | 7/1978 | Alessio | 173/13 |
| 4,692,073 A | * | 9/1987 | Martindell | 408/239 A |
| 4,900,202 A | * | 2/1990 | Wienhold | 408/240 |
| 5,129,118 A | * | 7/1992 | Walmesley | 7/158 |
| 5,191,666 A | * | 3/1993 | Corbin | 7/158 |
| 5,313,680 A | | 5/1994 | Ringler | 7/138 |
| 5,409,333 A | * | 4/1995 | Hu | 408/239 A |
| 5,470,180 A | * | 11/1995 | Jore | 408/239 R |
| 5,797,670 A | | 8/1998 | Snoke et al. | 362/119 |
| 5,921,562 A | * | 7/1999 | Robison | 279/128 |
| 6,688,611 B2 | * | 2/2004 | Gifford et al. | 279/71 |
| 6,860,489 B2 | * | 3/2005 | Chen | 279/82 |
| 6,863,280 B2 | * | 3/2005 | Chiu | 279/82 |

FOREIGN PATENT DOCUMENTS

| | | | | |
|---|---|---|---|---|
| DE | 3336549 A | * | 4/1984 | |
| DE | 3412913 A | * | 10/1984 | |
| DE | 29922863 U1 | * | 3/2000 | |
| JP | 05042404 A | * | 2/1993 | |
| WO | WO 9221469 A1 | * | 12/1992 | |

\* cited by examiner

*Primary Examiner* — Daniel Howell
(74) *Attorney, Agent, or Firm* — Charles E. Baxley

(57) ABSTRACT

A power tool combination includes a power driving device having a chuck device attached to a barrel for engaging with a driven tool member, a control ferrule engaged onto the barrel, and a non-circular member, and a tool device includes a housing having a bore for receiving the driven tool member, and having a compartment for receiving the barrel, and having a non-circular engaging member for engaging with the non-circular member and for allowing the housing to be rotated by the power driving device. The tool device includes a tool element attached to the housing, and a securing device for detachably attaching the tool element to the housing.

16 Claims, 6 Drawing Sheets

POWER TOOL COMBINATION

BACKGROUND OF THE INVENTION

1. Field of the Invention

The present invention relates to a power tool, and more particularly to a power tool combination including two or more tool members selectively and changeably attached to a power driving tool for allowing the user to easily and readily operate the power tool combination.

2. Description of the Prior Art

Typical power tools comprise a primary spindle or shaft rotatably supported in a housing and coupled to a motor driving means with a gearing mechanism, and a chuck device attached to a free end of the shaft for gripping or attaching a driven tool member for allowing the driven tool member to be rotated or driven by the motor driving means.

For example, U.S. Pat. No. 4,098,351 to Alessio discloses one of the typical power tools also comprising a chuck device attached to a free end of an output spindle which is coupled to a motor driving means with a gearing transmission for gripping or engaging with a driven tool member and for rotating or driving the driven tool member.

However, the chuck device is required to be rotated or threaded or unthreaded relative to the output spindle in order to grip or engage with the driven tool member, and it is time consuming and inconvenient to rotate or thread or unthread the chuck device relative to the output spindle.

U.S. Pat. No. 5,313,680 to Ringler discloses another typical power tool combination comprising a drilling tool and a wrenching tool selectively coupled or secured together, and an intermediate housing for attaching or supporting the drilling tool and the wrenching tool.

However, similarly, the intermediate housing is also required to be engaged with the chuck device after the chuck device is rotated or threaded or unthreaded relative to the output spindle such that it is also time consuming and inconvenient to rotate or thread or unthread the chuck device relative to the output spindle and to attach the intermediate housing to the chuck device.

U.S. Pat. No. 5,797,670 to Snoke et al. discloses a further typical power tool comprising a drilling tool attached to a distal end of an output spindle or a main body with a chuck device.

However, similarly, the chuck device is also required to be rotated or threaded or unthreaded relative to the output spindle in order to grip or engage with the drilling tool. In addition, such a typical power tool may only be used to rotate or drive the drilling tool, but may not be used to rotate or drive the other driven tool members.

The present invention has arisen to mitigate and/or obviate the afore-described disadvantages of the conventional power tool combinations.

SUMMARY OF THE INVENTION

The primary objective of the present invention is to provide a power tool combination including two or more tool members selectively and changeably attached to a power driving tool for allowing the user to easily and readily operate the power tool combination.

In accordance with one aspect of the invention, there is provided a power tool combination comprising a power driving device including a chuck device attached to a barrel for engaging with a driven tool member, and a control ferrule engaged onto the barrel for controlling the chuck device to engage with and to grip the driven tool member, and including a non-circular member, and a tool device including a housing having a bore formed therein for receiving the driven tool member, and having a compartment formed therein for receiving the barrel, and having a non-circular engaging member provided in the housing for engaging with the non-circular member and for allowing the housing to be rotated and driven by the non-circular member of the power driving device.

The tool device includes a tool element attached to the housing. The tool device includes a securing device provided on the housing for engaging with the tool element and for attaching the tool element to the housing.

The tool element includes an orifice formed therein, and a latch pin is slidably attached to the housing and engageable with the orifice of the tool element for latching the tool element to the housing and for preventing the tool element from being rotated relative to the housing.

A rotary member is further provided and rotatably attached onto the housing and engageable with the latch pin for selectively forcing the latch pin to engage with the orifice of the tool element and to latch the tool element to the housing.

The rotary member includes an inclined surface formed therein for engaging with the latch pin and for forcing the latch pin to engage with the orifice of the tool element by rotating the rotary member relative to the housing. A spring member is further provided and engaged with the housing and the latch pin for biasing the latch pin away from the tool element.

The housing includes a retaining device for detachably retaining the housing to the barrel and the non-circular member of the power driving device. The housing includes an inclined slot formed therein, the retaining device includes a sleeve attached onto the housing, and a spring member disposed between the housing and the sleeve and having an end portion engaged into the inclined slot of the housing for engaging with the barrel and for anchoring the housing to the barrel of the power driving device.

The barrel includes a peripheral recess formed in an outer peripheral portion thereof for engaging with the end portion of the spring member. The housing includes a detent slidably attached to the housing and engageable with the barrel, and the retaining device includes a sleeve attached onto the housing for engaging with the detent and for forcing the detent to selectively engage with the barrel.

A retaining ring is further provided and attached to the housing, and the sleeve includes two ratchet grooves formed therein for engaging with the retaining ring and for anchoring the sleeve to the housing at selected positions. The sleeve includes a depression formed therein for selectively receiving and engaging with the detent and for allowing the detent to be selectively disengaged from the barrel.

The housing includes an engaging hole formed in a free end portion thereof for engaging with a driven tool element. The housing includes a detent slidably attached to the housing and engageable with the driven tool element, and a control ferrule attached onto the housing for engaging with the detent and for forcing the detent to selectively engage with the driven tool element.

The control ferrule includes a depression formed therein for selectively receiving and engaging with the detent and for allowing the detent to be disengaged from the driven tool element. The control ferrule includes a magnetic member for attracting and retaining a driven member to the driven tool element and the housing.

The housing includes an inclined slot formed therein, a control ferrule attached onto the housing, and a spring member disposed between the housing and the control ferrule and having an end portion engaged into the inclined slot of the housing for engaging with the driven tool element and for anchoring the driven tool element to the housing.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
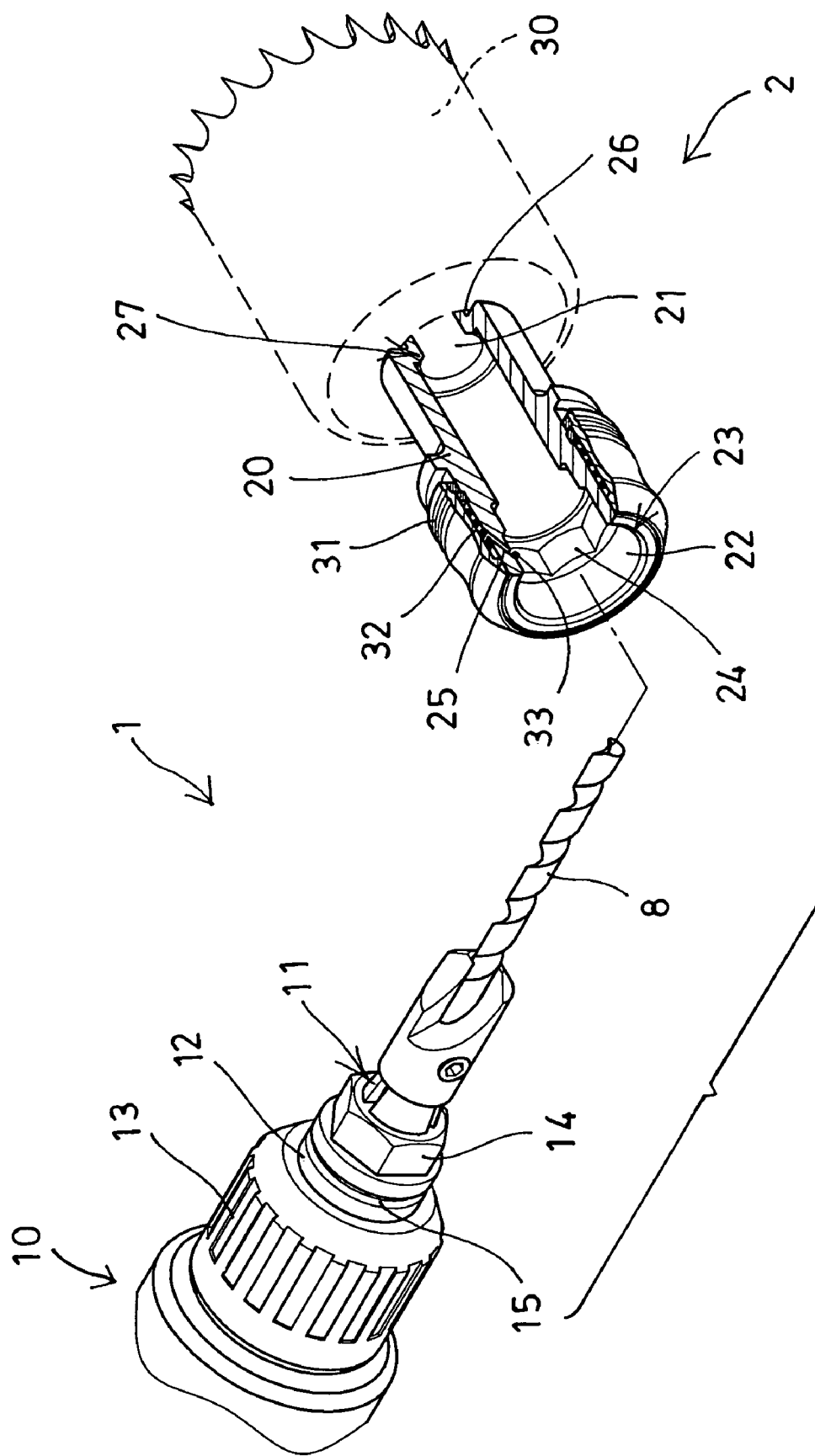
FIG. 1 is a partial exploded view of a power tool combination in accordance with the present invention.
Figure 2:
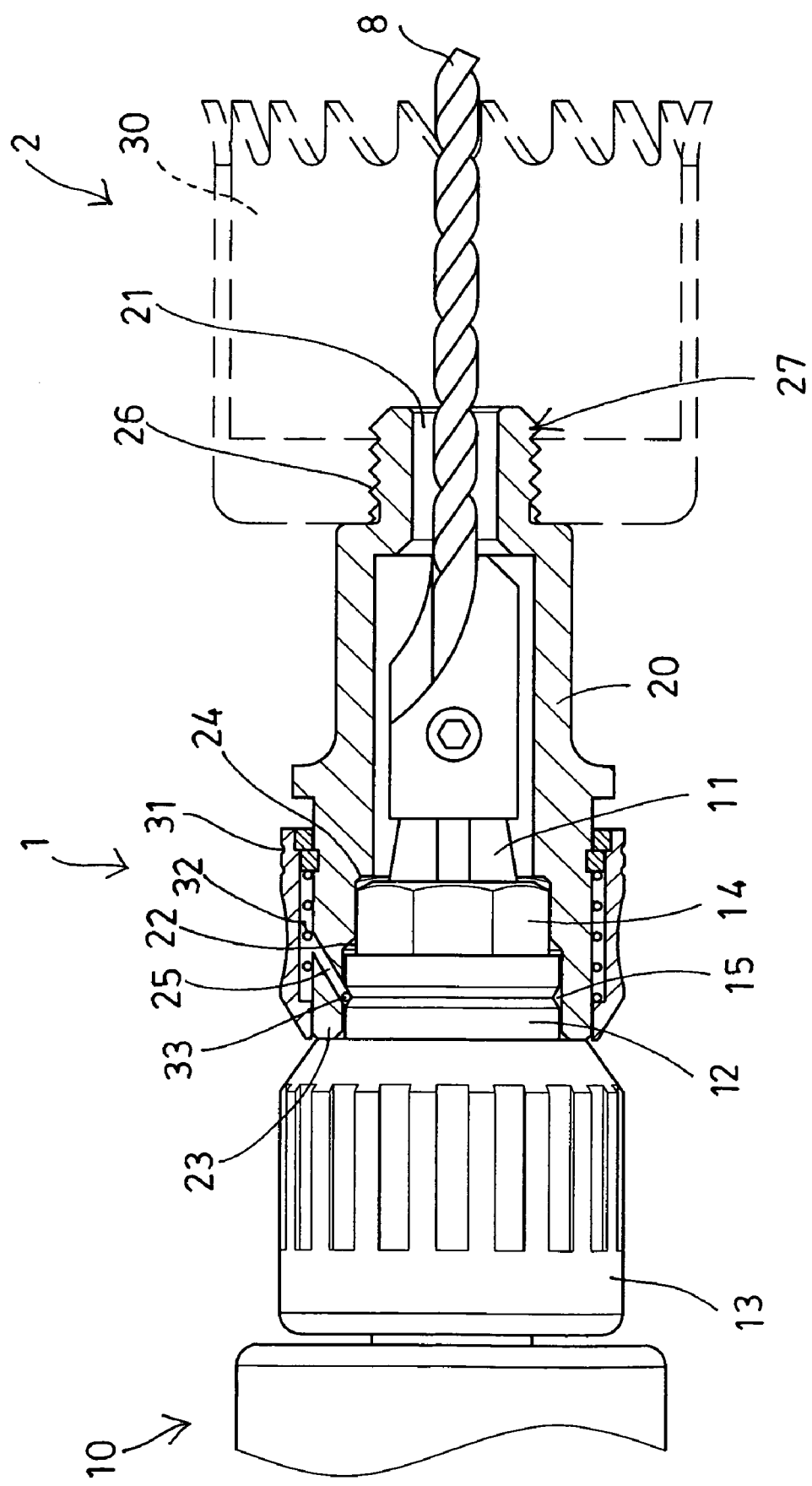
FIG. 2 is a partial cross sectional view of the power tool combination as shown in FIG. 1.

Referring to the drawings, and initially to FIGS. 1 and 2, a power tool combination 1 in accordance with the present invention comprises a power driving means or power driving device 10 including a chuck device 11 attached or received in a barrel 12 for receiving or engaging with a driven tool member 8, such as a drilling tool 8, a control ferrule 13 attached or engaged onto the barrel 12 for controlling or rotating or driving the chuck device 11 to engage with or to grip or grasp the driven tool member 8, and a fastener or non-circular member 14 attached to the barrel 12 for engaging with a driving tool element, such as a wrench (not shown) which may position the barrel 12 in place for allowing the control ferrule 13 to be rotated relative to the barrel 12.

The chuck device 11 may thus be actuated or operated by the control ferrule 13 and/or the barrel 12 and the non-circular member 14 to grip or grasp the driven tool member 8, or to release the driven tool member 8 selectively. The other driven tool members, such as the wrenching tools, the screw driving tools (not shown) or the like may also be selectively attached to or engaged with the chuck device 11. The chuck device 11 is normally attached or coupled to an output spindle (not shown) which is coupled to a motor driving means (not shown) with a gearing transmission (not shown) for being rotated or driven by the motor driving means. The above-described structure is typical and will not be described in further details. The barrel 12 includes a peripheral recess 15 formed in the outer peripheral portion thereof.

The power tool combination 1 in accordance with the present invention further comprises one or more tool devices 2 to be selectively and changeably attached to or engaged with the power driving device 10 for being rotated or driven by the power driving device 10. For example, as shown in FIGS. 1 and 2, the tool device 2 includes a tubular member or housing 20 having a bore 21 formed therein for receiving or engaging with the driven tool member 8 and/or the chuck device 11 (FIG. 2), and having an enlarged compartment 22 formed in one end portion 23 thereof for receiving or engaging with the barrel 12, and having a non-circular protrusion or engaging member 24 formed in the housing 20 or extended into the bore 21 or the compartment 22 or the housing 20 for engaging with the non-circular member 14 and for allowing the housing 20 to be rotated or driven by the non-circular member 14 of the power driving device 10.

The housing 20 further includes an inclined slot 25 formed in the one end portion 23 thereof, and includes an attaching or engaging or securing means or device 26 attached to or formed in the other end portion 27 thereof for engaging with or for attaching a tool element 30, such as a circular saw blade 30 and for allowing the tool element or circular saw blade 30 to be rotated or driven by the power driving device 10. A sleeve 31 is rotatably attached onto the housing 20, and a spring member 32 is disposed or received or engaged between the housing 20 and the sleeve 31, and includes an end portion 33 engaged into the inclined slot 25 of the housing 20 for engaging with the peripheral recess 15 of the barrel 12 and for anchoring or positioning or securing the housing 20 to the barrel 12 of the power driving device 10.

The end portion 33 of the spring member 32 may be moved or disengaged from the peripheral recess 15 of the barrel 12 by moving the sleeve 31 relative to the housing 20 for allowing the housing 20 to be easily engaged onto the barrel 12 and the non-circular member 14 and to be quickly latched or anchored or secured to the barrel 12 and the non-circular member 14 by engaging the end portion 33 of the spring member 32 into the peripheral recess 15 of the barrel 12, and thus for allowing the tool device 2 to be selectively and changeably and easily and quickly attached to or engaged with the power driving device 10 and to be rotated or driven by the power driving device 10.

Figure 3:
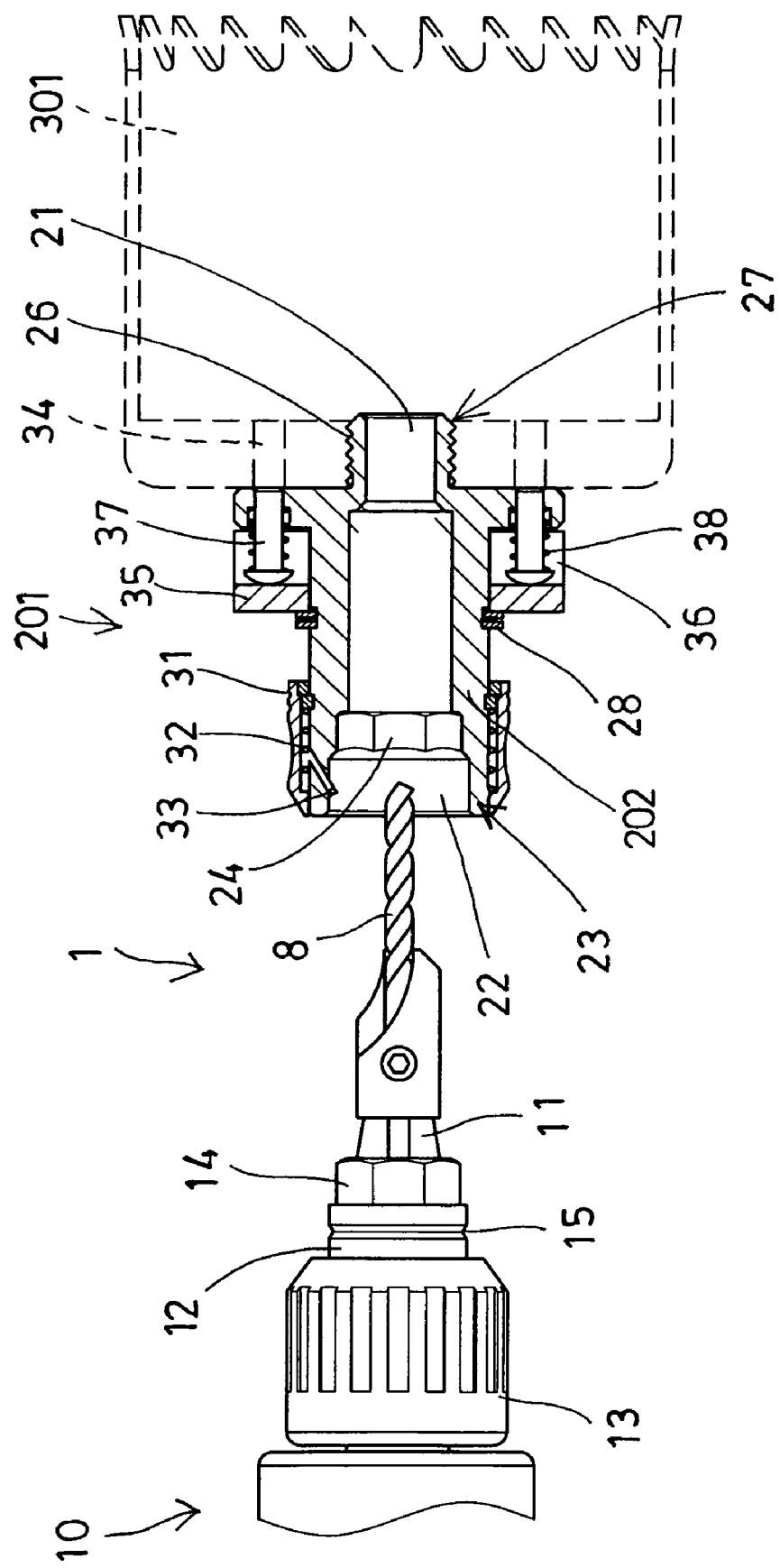
FIG. 3 is another partial cross sectional view similar to FIG. 2, illustrating the other arrangement of the power tool combination.

As shown in FIG. 3, the power tool combination 1 in accordance with the present invention further comprises another tool device 201 also including a housing 202 having a bore 21 for receiving or engaging with the driven tool member 8 and/or the chuck device 11, and having an enlarged compartment 22 formed in one end portion 23 thereof for receiving or engaging with the barrel 12, and having a non-circular protrusion or engaging member 24 for engaging with the non-circular member 14, a tool element 301 is also attached to the housing 202 with the attaching or engaging or securing means or device 26, and a spring member 32 is disposed or received or engaged between the housing 202 and the sleeve 31 and includes an end portion 33 for anchoring or positioning or securing the housing 202 to the barrel 12 of the power driving device 10. The tool element 301 includes one or more (such as two) orifices 34 formed therein. A rotary member 35 is rotatably attached onto the housing 202, and a retaining ring 28 is attached to the housing 202 and engaged with the rotary member 35 for rotatably retaining the rotary member 35 to the housing 202.

The rotary member 35 includes one or more (such as two) inclined surfaces 36 formed therein, and one or more (such as two) spring-biased latch pins 37 are slidably attached to the housing 202 and engageable with the orifices 34 of the tool element 301 for latching or anchoring or positioning or securing the tool element 301 to the housing 202 and for preventing the tool element 301 from being rotated relative to the housing 202. A spring member 38 is disposed or engaged with the housing 202 and each of the latch pins 37 for biasing the latch pin 37 away from the tool element 301, and the inclined surfaces 36 of the rotary member 35 are engaged with the latch pins 37 for selectively moving or biasing or forcing the latch pins 37 to engage with the orifices 34 of the tool element 301 selectively.

Figure 4:
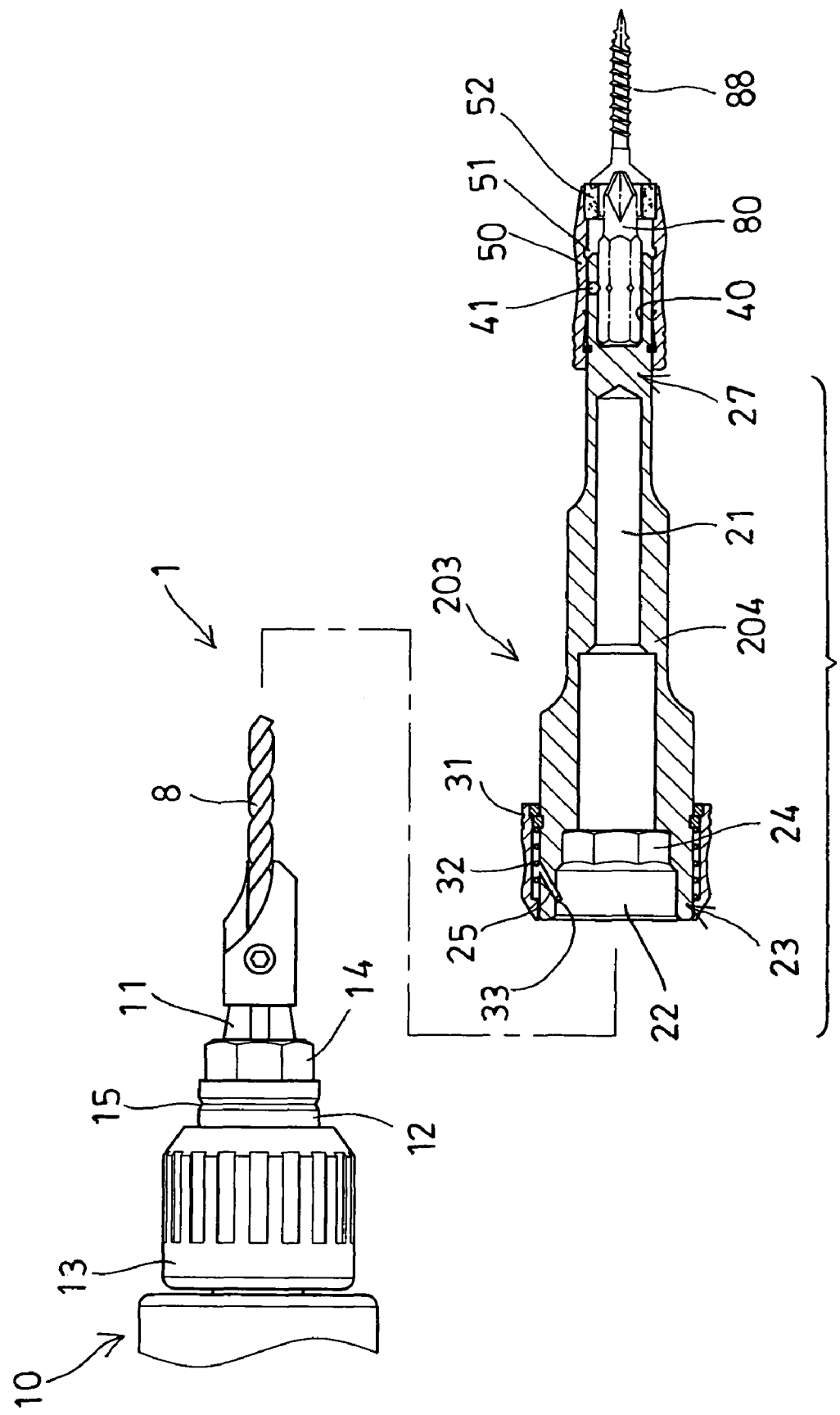
FIG. 4 is a partial exploded and partial cross sectional view illustrating the still further arrangement of the power tool combination.

As shown in FIG. 4, the power tool combination 1 in accordance with the present invention further comprises a further tool device 203 also including a housing 204 having a bore 21 for receiving or engaging with the driven tool member 8 and/or the chuck device 11, and having an enlarged compartment 22 formed in one end portion 23 thereof for receiving or engaging with the barrel 12, and having a non-circular protrusion or engaging member 24 for engaging with the non-circular member 14, a spring member 32 is disposed or received or engaged between the housing 204 and the sleeve 31 and includes an end portion 33 for anchoring or positioning or securing the housing 204 to the barrel 12 of the power driving device 10. The housing 204 includes an engaging hole 40 formed in the other or outer or free end portion 27 thereof for engaging with or for attaching a driven tool element 80, such as a screw driver bit 80.

A detent 41 is slidably attached to or engaged with the housing 204 and engageable with the driven tool element 80 for detachably anchoring or positioning or securing the driven tool element 80 to the housing 20. Another control ferrule 50 is slidably attached or engaged onto the other end portion 27 of the housing 204 for engaging with the detent 41 and for forcing the detent 41 to selectively engage with the driven tool element 80, and includes a depression 51 formed therein for selectively receiving or engaging with the detent 41 and for allowing the detent 41 to be disengaged from the driven tool element 80, and includes a magnetic member 52 for attracting and retaining a screw or driven member 88 to the driven tool element 80 and the housing 204.

Figure 5:
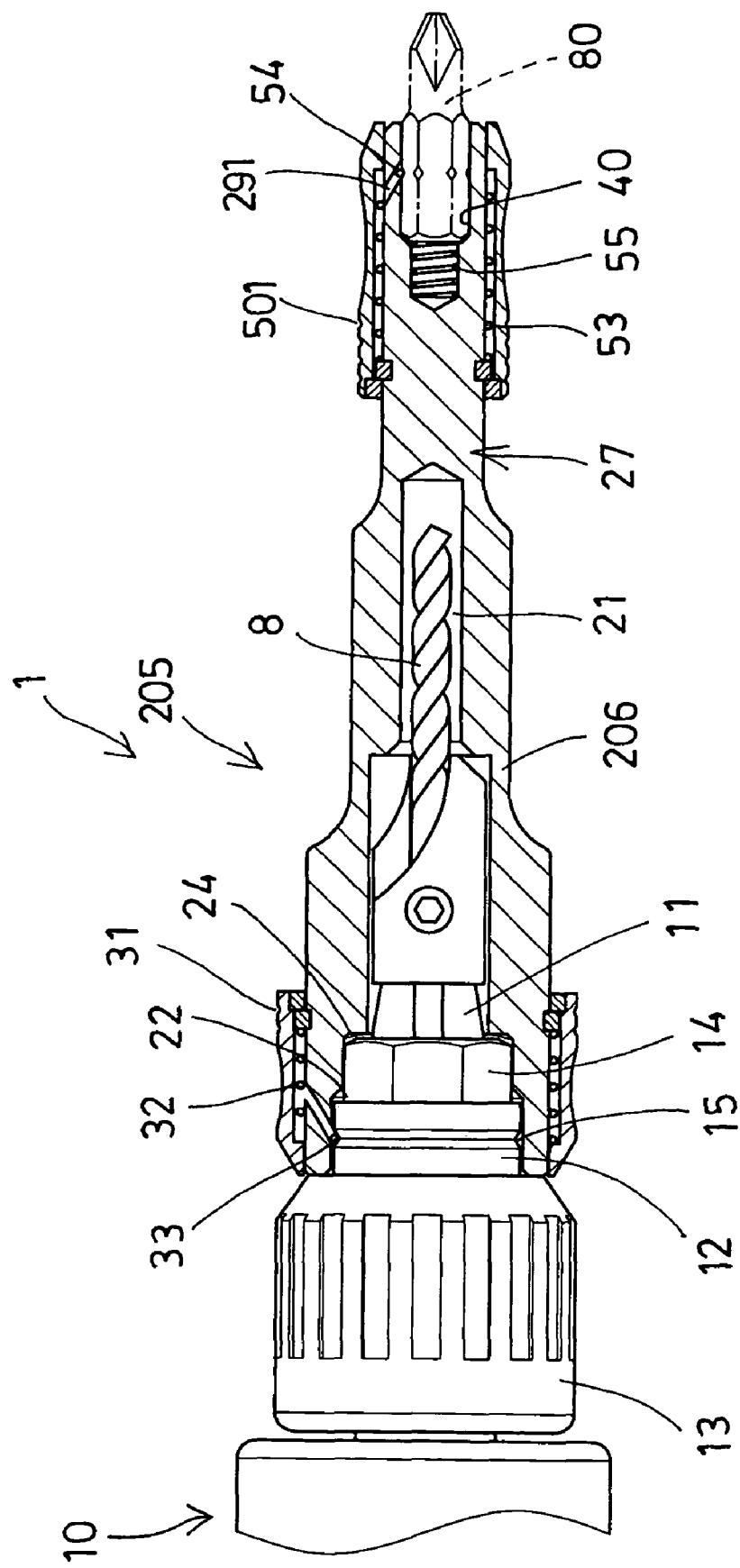
FIG. 5 is a further partial cross sectional view similar to FIG. 2, illustrating the still further arrangement of the power tool combination.

As shown in FIG. 5, the power tool combination 1 in accordance with the present invention further comprises a still further tool device 205 also including a housing 206 having a bore 21 for receiving or engaging with the driven tool member 8 and/or the chuck device 11, and having an enlarged compartment 22 formed in one end portion 23 thereof for receiving or engaging with the barrel 12, and having a non-circular protrusion or engaging member 24 for engaging with the non-circular member 14, a spring member 32 is disposed or received or engaged between the housing 206 and the sleeve 31 and includes an end portion 33 for anchoring or positioning or securing the housing 206 to the barrel 12 of the power driving device 10. The housing 206 also includes an engaging hole 40 formed in the other end portion 27 thereof for engaging with or for attaching a driven tool element 80, such as a screw driver bit 80.

A further control ferrule 501 is also slidably attached or engaged onto the other end portion 27 of the housing 206, and a further spring member 53 is disposed or received or engaged between the housing 206 and the control ferrule 501 and includes an end portion 54 engaged into an inclined slot 291 of the housing 206 for engaging with the driven tool element 80 and for detachably anchoring or positioning or securing the driven tool element 80 to the housing 206, the housing 206 may further include a still further spring member 55 disposed or received or engaged in the housing 206 and engaged with the driven tool element 80 for selectively biasing the driven tool element 80 out of the other end portion 27 of the housing 206.

Figure 6:
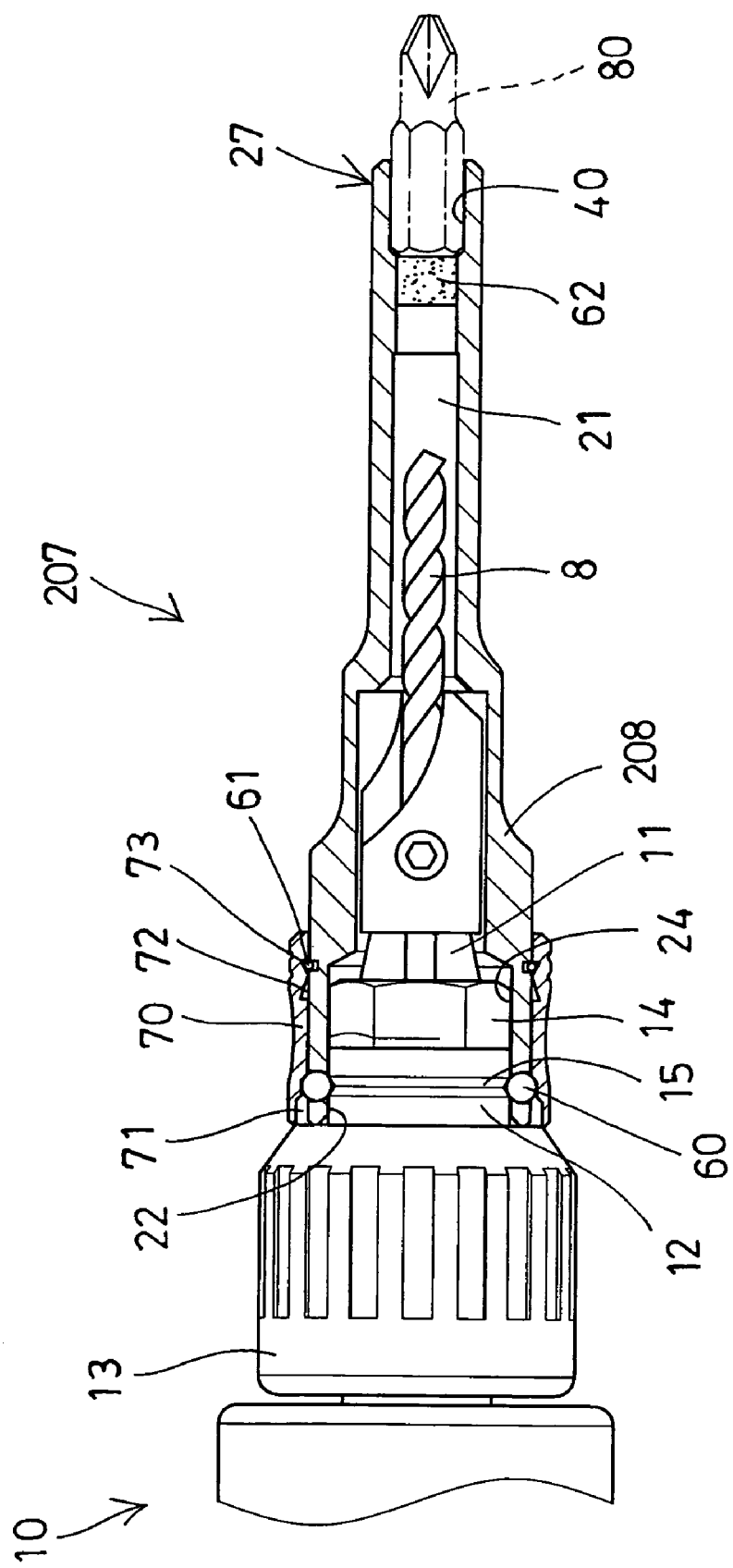
FIG. 6 is a still further partial cross sectional view similar to FIGS. 2 and 5, illustrating the still further arrangement of the power tool combination.

As shown in FIG. 6, the power tool combination 1 in accordance with the present invention further comprises a still further tool device 207 also including a housing 208 having a bore 21 for receiving or engaging with the driven tool member 8 and/or the chuck device 11, and having an enlarged compartment 22 formed in one end portion 23 thereof for receiving or engaging with the barrel 12, and having a non-circular protrusion or engaging member 24 for engaging with the non-circular member 14, the housing 208 also includes an engaging hole 40 formed in the other end portion 27 thereof for engaging with or for attaching a driven tool element 80, such as a screw driver bit 80.

One or more (such as two) detents 60 are slidably attached to or engaged with the housing 208 and engageable with the peripheral recess 15 of the barrel 12 and for detachably anchoring or positioning or securing the housing 208 to the barrel 12. Another sleeve 70 is rotatably attached onto the housing 208 for engaging with the detents 60 and for forcing the detents 60 to selectively engage with the barrel 12, and includes one or more depressions 71 formed therein for selectively receiving or engaging with the detents 60 and for allowing the detents 60 to be disengaged from the barrel 12, and includes two ratchet grooves 72, 73 formed therein for receiving or engaging with a retaining ring 61 which may anchor or positioning the sleeve 70 to the housing 208 at selected locations or positions. The housing 208 may further include a magnetic member 62 disposed therein for attracting and retaining a screw driver bit 80 to the housing 208.

In operation, as shown in FIGS. 1-6, either of the tool devices 2, 201, 203, 205, 207 may be selectively and changeably and easily and readily and quickly attached to or engaged with the chuck device 11 and the barrel 12 and the non-circular member 14 of the power driving device 10, without additional tools, for being selectively and changeably rotated or driven by the power driving device 10. The spring member 32 or the detents 60 may be formed or act as a retaining means or device for detachably retaining the housing 20 to the barrel 12 and the non-circular member 14 of the power driving device 10. It is to be noted that the typical power tools failed to provide a tool device 2, 201, 203, 205, 207 including a housing 20 having a bore 21 for receiving or engaging with the driven tool member 8, and having an enlarged compartment 22 for receiving or engaging with the barrel 12, and having a non-circular protrusion or engaging member 24 for engaging with the non-circular member 14 of the power driving device 10.

Accordingly, the power tool combination in accordance with the present invention includes two or more tool members selectively and changeably attached to a power driving tool for allowing the user to easily and readily actuate or operate the power tool combination.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A power tool combination comprising:
a power driving device including a chuck device attached to a barrel for engaging with a driven tool member, and a control ferrule engaged onto said barrel for controlling said chuck device to engage with and to grip said driven tool member, and including a non-circular member, and
a tool device including a housing having a bore formed therein for receiving said driven tool member, and having a compartment formed therein for receiving said barrel, and having a non-circular engaging member provided in said housing for engaging with said non-circular member and for allowing said housing to be rotated and driven by said non-circular member of said power driving device, said tool device including a tool element attached to said housing, and said tool element including an orifice formed therein, and a latch pin slidably attached to said housing and engageable with said orifice of said tool element for latching said tool element to said housing and for preventing said tool element from being rotated relative to said housing.

2. The power tool combination as claimed in claim 1, wherein said housing includes an engaging hole formed in a free end portion thereof for engaging with a driven tool element.

3. The power tool combination as claimed in claim 1, wherein said tool device includes a securing device provided on said housing for engaging with said tool element and for attaching said tool element to said housing.

4. The power tool combination as claimed in claim 2, wherein said housing includes a detent slidably attached to said housing and engageable with said driven tool element, and a control ferrule attached onto said housing for engaging with said detent and for forcing said detent to selectively engage with said driven tool element.

5. The power tool combination as claimed in claim 1, wherein a rotary member is rotatably attached onto said housing and engageable with said latch pin for selectively forcing said latch pin to engage with said orifice of said tool element.

6. The power tool combination as claimed in claim 5, wherein said rotary member includes an inclined surface formed therein for engaging with said latch pin and for forcing said latch pin to engage with said orifice of said tool element by rotating said rotary member relative to said housing.

7. The power tool combination as claimed in claim 5, wherein a spring member is engaged with said housing and said latch pin for biasing said latch pin away from said tool element.

8. The power tool combination as claimed in claim 1, wherein said housing includes a retaining device for detachably retaining said housing to said barrel and said non-circular member of said power driving device.

9. The power tool combination as claimed in claim 8, wherein said housing includes an inclined slot formed therein, said retaining device includes a sleeve attached onto said housing, and a spring member disposed between said housing and said sleeve and having an end portion engaged into said inclined slot of said housing for engaging with said barrel and for anchoring said housing to said barrel of said power driving device.

10. The power tool combination as claimed in claim 9, wherein said barrel includes a peripheral recess formed in an outer peripheral portion thereof for engaging with said end portion of said spring member.

11. The power tool combination as claimed in claim 8, wherein said housing includes a detent slidably attached to said housing and engageable with said barrel, and said retaining device includes a sleeve attached onto said housing for engaging with said detent and for forcing said detent to selectively engage with said barrel.

12. The power tool combination as claimed in claim 11, wherein a retaining ring is attached to said housing, and said sleeve includes two ratchet grooves formed therein for engaging with said retaining ring and for anchoring said sleeve to said housing at selected positions.

13. The power tool combination as claimed in claim 11, wherein said sleeve includes a depression formed therein for selectively receiving and engaging with said detent and for allowing said detent to be disengaged from said barrel.

14. The power tool combination as claimed in claim 4, wherein said control ferrule includes a depression formed therein for selectively receiving and engaging with said detent and for allowing said detent to be disengaged from said driven tool element.

15. The power tool combination as claimed in claim 14, wherein said control ferrule includes a magnetic member for attracting and retaining a driven member to said driven tool element and said housing.

16. The power tool combination as claimed in claim 2, wherein said housing includes an inclined slot formed therein, a control ferrule attached onto said housing, and a spring member disposed between said housing and said control ferrule and having an end portion engaged into said inclined slot of said housing for engaging with said driven tool element and for anchoring said driven tool element to said housing.

* * * * *